W. C. WREN & W. BARKER.

Making Illuminating Gas from Petroleum.

No. 6,568. Reissued July 27, 1875.

Witnesses.

Joshua Barhart

David C. Ruigland

Inventors.

William C Wren

William Barker

UNITED STATES PATENT OFFICE.

WILLIAM C. WREN AND WILLIAM BARKER, OF BROOKLYN, ASSIGNORS, BY MESNE ASSIGNMENTS, TO CHARLES F. DEAN, OF NEW YORK, N. Y.

IMPROVEMENT IN MAKING ILLUMINATING-GAS FROM PETROLEUM.

Specification forming part of Letters Patent No. 56,843, dated July 31, 1866; reissue No. 5,873, dated May 12, 1874; reissue No. 6,568, dated July 27, 1875; application filed June 21, 1875.

*To all whom it may concern:*

Be it known that WILLIAM C. WREN and WILLIAM BARKER, both of the city of Brooklyn, in the county of Kings and State of New York, did invent a new and improved mode of making and producing gas for illuminating purposes from the basis of crude petroleum and kindred material; and I do hereby declare that the following is a full and exact description thereof, reference being had to the accompanying drawings and to the letters of reference marked thereon.

The nature of the invention of said WREN and BARKER consists in the production of illuminating-gas from crude petroleum or other kindred material by the process of vaporizing a body of liquid hydrocarbon, such as petroleum, naphtha, &c., in a still, and converting the vapor evolved from the still into illuminating-gas in a retort or retorts heated by a fire or fires independent of the heat which heats the still—that is to say, an intense heat is produced in and throughout one or more superheaters, such as are marked 2 and 3 on the annexed diagram, the number used being governed by circumstances. These superheaters are, in fact, retorts, such as are well known in gas-making, and may be of any convenient shape, and are to be heated up to the point necessary for the conversion of vapor into gas, and their effective heating-surface is increased by the use of screens or other obstructions, in the manner well known before the invention of said WREN and BARKER; but these devices are not claimed as the invention of WREN and BARKER. In conducting the process these retorts are heated by fires in the usual way, so as to bring their temperature up to the converting-point, at which permanent gas is made preparatory to the admission into them of the vapor of petroleum or its kindred products from the still.

Figure 1:
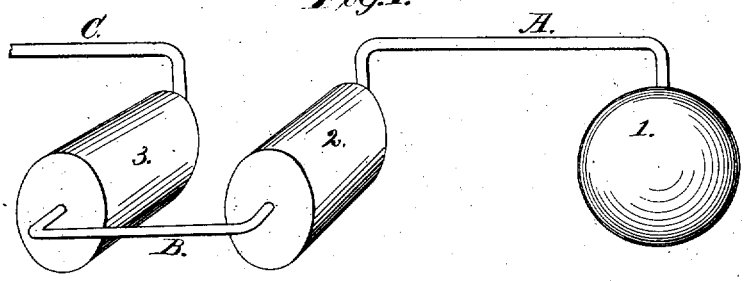
Figure 2:
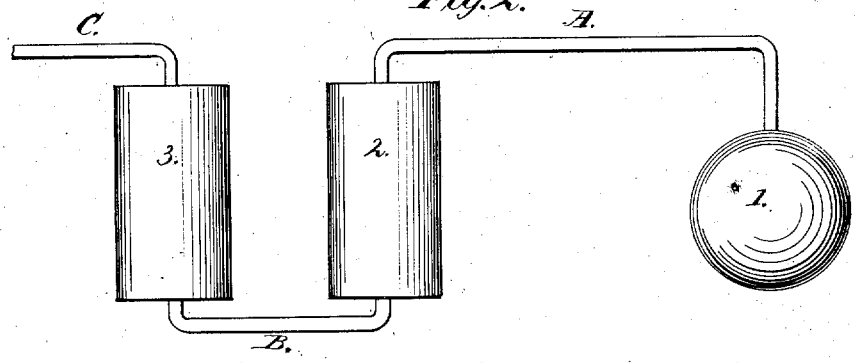

Figure 1 is a vessel, which, in the process, performs the function of a still. In the drawing it is shown spherical, but its shape is not material. It should be large enough to contain a charge of liquid hydrocarbon, which is desired to be worked off in one batch, and is to be filled or charged and closed up, except the pipe, as shown in the drawing, before the heat is applied to it. It is then to be heated with a heat which gradually increases.

A bed of porous material in the bottom of the still facilitates the operation, but this is well known in distilling, and is not claimed as the invention of WREN and BARKER.

The exhalation or vapor produced from the material by the action of the heat passes by a pipe, A, into the superheater or retort 2, and there, coming into contact with the red-hot surfaces of the retort, it is converted into permanent gas, so that when it passes out of the retort it is no longer condensable, as it would be when in a state of vapor, issuing out of the still.

Two or more retorts may be used, if one is not sufficient, to convert the vapor from the still into gas and free it from moisture.

In the drawing, B is a pipe leading the gas from the first to the second retort 3; and $C_1$ the pipe leading the gas out of the retorts, in the manner usual in gas-works, which need not be described.

It is apparent that the success of the operation of converting the vapor issuing out of the still into permanent gas will depend upon the relative supply of vapor, as compared with the extent of hot surfaces in the retorts. It is, therefore, necessary that the heat of the still should be independent of the heat of the retorts.

The process invented by the said WREN and BARKER depends upon the natural fact that when a charge of liquid hydrocarbon is supplied to a still, and worked off in the form of vapor, the vapors of different densities follow each other in succession as the charge is evaporated to greater density, wherein this process differs from the older processes of making illuminating-gas from liquid hydrocarbon, in which the liquid is fed drop by drop to the hot surfaces of an evaporating apparatus, and each drop evaporated by itself, giving out all its vapor practically at once, and leaving the non-volatile portions to accumulate in the still.

What I claim as the invention of WILLIAM C. WREN and WILLIAM BARKER is—

The above-described process of producing illuminating-gas from petroleum or its kindred products, in which a charge of liquid hydrocarbon is gradually heated in a still, and the resultant vapors are then converted from their vaporous form into permanent gas in a retort or retorts heated by independent fires, substantially as described.

CHARLES F. DEAN.

Witnesses:
JNO. R. LEFFERTS,
JOHN MCCRONE.